United States Patent [19]
Isbister

[11] 4,031,535
[45] June 21, 1977

[54] MULTIPLE FREQUENCY NAVIGATION RADAR SYSTEM

[75] Inventor: Eric J. Isbister, Greenlawn, N.Y.

[73] Assignee: Sperry Rand Corporation, New York, N.Y.

[22] Filed: Nov. 10, 1975

[21] Appl. No.: 630,553

[52] U.S. Cl. .......................... 343/6.5 R; 343/18 D
[51] Int. Cl.² ..................... G01S 9/56; H01Q 15/14
[58] Field of Search ......... 343/6.5 R, 6.5 SS, 6.8 R, 343/18 D

[56] References Cited
UNITED STATES PATENTS

| | | |
|---|---|---|
| 3,798,642 | 3/1974 | Augenblick et al ....... 343/6.5 SS X |
| 3,896,440 | 7/1975 | Wheeler .......................... 343/18 D |
| 3,944,928 | 3/1976 | Augenblick et al ........ 343/6.8 R X |

Primary Examiner—T.H. Tubbesing

Attorney, Agent, or Firm—Howard P. Terry; Seymour Levine

[57] ABSTRACT

A navigation system in which a transmitter-antenna combination radiates two independent signals with a known frequency separation there between. These signals are radiated to an antenna on a navigation marker whereby they are received and directed to a non-linear device in which signals at the fundamental frequencies and frequencies that are linear combinations of the two fundamental frequencies are generated. These generated signals are then guided to the antenna and retro-directively re-radiated. The re-radiated signals are received by an antenna at the transmitting location and directed to a receiver wherein the fundamental frequencies and the desired linear combination thereof are detected and processed to provide the locations and identification of the navigation markers.

11 Claims, 6 Drawing Figures

MULTIPLE FREQUENCY NAVIGATION RADAR SYSTEM

BACKGROUND OF THE INVENTION

1. Field of the Invention

This invention relates to navigation systems and more particularly to navigation systems which utilize frequency diversity transmission for the illumination of navigation markers which include retro-directive elements containing non-linear devices which re-radiate signals with frequencies that are linear combinations of the frequencies of the received signals, thus providing a means for identifying the markers.

2. Description of the Prior Art

Navigational systems have been proposed heretofore that employ retro-directive identifiable devices to mark channels or routes to be taken navigating vehicles. Some of the earlier systems such as that taught in U.S. Pat. No. 2,461,005, issued on Feb. 8, 1949 to G. C. Southworth and in U.S. Pat. No. 2,520,008, issued on Aug. 22, 1950 to A. P. King, provide an identification means by modulating the signal received at the marker prior to retransmitting the signal. However, these systems retransmit frequencies that have been originally transmitted and as such must compete with returns from background clutter at the receiver. In many environments the energy level of the background clutter at the receiver is such that the modulated reradiated signals may not be detected.

Later systems such as that taught in U.S. Pat. No. 3,518,546, issued on June 30, 1970 to A. A. Augenblick et al provide a non-linear element in the retro-directive device to generate harmonics of the frequency of the received signals and a means for modulating same. These harmonic signals are then reradiated towards a receiver located adjacent to the original transmitter. Since signals are reradiated at a harmonic frequency, rathen than at the fundamental or received frequency, separation from the fundamental signal returns of the background clutter is theoretically more easily accomplished at the receiver. However, a heterodyning receiver is usually a generator of harmonic signals and some portion of the background clutter fundamental signal is converted to harmonic signals tending to mask the desired externally generated harmonic signals. To minimize this possibility filters with extremely deep and steep passband characteristics are employed prior to mixing the received harmonic signals with the local oscillator signals. Further, stringent transmitter and local oscillator frequency control is required to maintain the desired signals within the filter and i.f. amplifier passbands.

The present invention is directed to an improved navigation system which utilizes retro-directive devices that reradiate signals which are identifiable with respect to normal signal returns from land, ice, rain and sea clutter. These signals are readily detected and facilitate the identification of route markers in a high clutter environment.

SUMMARY OF THE INVENTION

The present invention is directed to an improved navigation system that readily detects and identifies route markers in a high clutter environment. A transmitter and antenna combination radiates two independent signals with a known frequency separation therebetween. The radiated signals propagate to a navigation marker containing a Luneberg lens with an equatorial band of element antennas thereon. The Luneberg lens directs the illuminating signals to one of the element antennas, the signal being guided therefrom to a non-linear device wherein signals at the fundamental frequencies and at frequencies which are linear combinations thereof are generated. These generated signals are then guided to the element antenna for reradiation to the original transmitting location whereat they are received and the fundamental and linear combination signals are separated. After separation each linear combination signal is reduced to video and summed with the video of the other linear combination signals while the fundamental signals are correlated in a manner similar to the correlation of a frequency diversity radar system to improve the signal to clutter ratio. Summed video and the correlation video are then coupled to a display unit and to a processing unit for marker tracking and identification.

DESCRIPTION OF THE PREFERRED EMBODIMENTS

When two signals with different frequencies are received by a non-linear device, such as a crystal diode, a multiplicity of frequencies are generated which are linear combinations of the fundamental frequencies and harmonics thereof. If the frequencies of the signals received by the non-linear device are $f_1$ and $f_2$, the generated frequencies will be $mf_1 \pm nf_2$, $m$ and $n$ being integers, the values of which are dependent upon the characteristics of the non-linear device and the received signal level. For example, a non-linear device receiving two signals with frequencies $f_1$ and $f_2$ operating at a signal level for which a cube term is included in the voltage-current Taylor expansion of the device, will generate signals with frequencies of $f_1, f_2, 3f_1, 3f_2, 2f_1+f_2$, $2f_2$ $3f_1, 2f_1-f_2$ and $2f_2-f_1$. Any combination of these frequencies may be employed by the present invention. However, to maintain the over-all operation within a reasonable frequency bandwidth, the frequencies utilized should be: $f_1, f_2$ $2f_1-f_2$ and $2f_2-f_1$. Other terms generally exist in the Taylor expansion, resulting in a multiplicity of available harmonic combinations that may be selected along with $f_1$ and $f_2$ to maintain a reasonable operating bandwidth. While the invention will be described in terms of a system in which a non-linear device is illuminated by a composite signal comtaining two frequencies, it will be obvious to those skilled in the art that the invention may be implemented with a greater number of illuminating frequencies with a concomittant increase in available linear combinations of generated frequencies.

Figure 1:
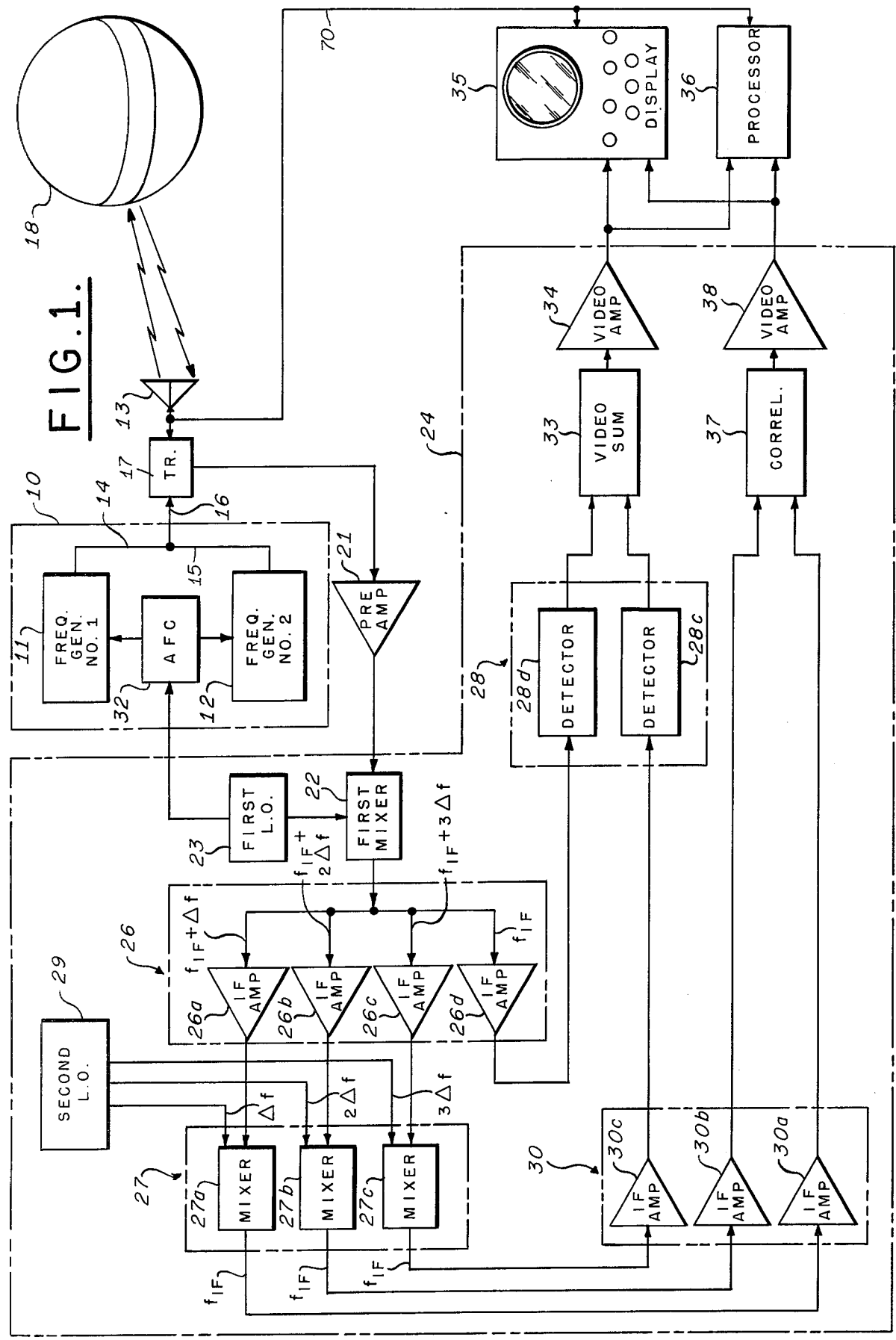
FIG. 1 is a block diagram illustrating an embodiment of the invention.

Referring now to FIG. 1, therein is illustrated an embodiment of the invention in which two signals with frequencies $f_1$ and $f_2$, wherein $f_2 = f_1 + \Delta f$, are transmitted by transmitter 10 which includes a signal generator 11 for generating a signal at a frequency $f_1$ and a signal generator 12 for generating a signal at a frequency $f_2$. The output signals from signal generators 11 and 12 are coupled to antenna 13 via transmission lines 14, 15 and 16 and TR device 17, these signals being radiated from antenna 13 to subsequently illuminate retrodirective antenna 18, yet to be described, which contains a non-linear device for the generation of signals at frequencies which are linear combinations of the frequencies $f_1$ and $f_2$. Since the signals at linear combinations of $f_1$ and $f_2$ can only emanate from the antenna 18 which contains a non-linear device, they may be more easily detected in a clutter environment than can the signals at frequencies $f_1$ and $f_2$. Signals with frequencies $f_1$, $f_2$ and the linear combinations thereof are re-radiated from antenna 18 and received by antenna 13, from which they are coupled through TR device 17 to preamplifier 21 wherein the total received signal, comprising components at frequencies $f_1$, $f_2$ and linear combinations thereof, is amplified and then coupled to a first mixer unit 22 to which a first local oscillator 23, operating at a frequency $f_{LO}$ is also coupled. Though a single antenna and a TR device, to accomplish energy transmission and reception, is described in this embodiment, it should be understood that these functions could also be performed by two separate antennas; a transmitting antenna directly coupled to the transmitter 10 and a receiving antenna directly coupled to the preamplifier 21.

The first mixer 22 and the first local oscillator 23 are included in receiver 24 which also includes a frequency selection unit 26, a second mixer unit 27, a detector unit 28, a second local oscillator 29, an IF amplifier unit 30, video sum unit 33, video amplifier 34, correlator 37 and video amplifier 38. The composite signal at the output terminals of the first mixer 22 is then coupled to frequency selection unit 26 which contains tuned amplifiers 26a, 26b, 26c and 26d wherein signals having frequencies $f_{IF}$, $f_{IF} + \Delta f$, $f_{IF} + 2\Delta f$, and $f_{IF} + 3\Delta f$ are selected and amplified. Where: $f_{IF} = 2f_1 - f_2 - f_{LO}$; $f_{IF} + \Delta f = f_1 - f_{LO}$; $f_{IF} + 2\Delta f = f_2 - f_{LO}$; and $f_{IF} + 3\Delta f = 2f_2 - f_1 - f_{LO}$. Though a series of tuned amplifiers are employed for frequency separation in this embodiment of the invention, it should be apparent to those skilled in the art that passive filters may have been utilized to perform this frequency separation function.

The signal of the first local oscillator 23 is also coupled to automatic frequency control (AFC) unit 32 contained within the transmitter 10. Frequency control signals from AFC 32 are coupled to the frequency generators 11 and 12 as reference signals for maintaining the frequency separation $\Delta f$ between the frequencies $f_1$ and $f_2$ and for maintaining frequencies $f_1$ and $f_2$ within limits which insure that the frequencies of the component signals at the ouput terminal of mixer 27 are within the passbands of the tuned amplifiers 26a through 26d.

After frequency separation and amplification, the signals at the output terminals of the amplifiers 26a, 26b and 26c are respectively coupled to mixers 27a, 27b and 27c of second mixer unit 27 and a signal at the output terminal of the amplifier 26d, which is at a frequency $f_{IF}$, is coupled to detector 28d of detector unit 28. A second local oscillator 29 couples a signal with frequency $\Delta f$ to mixer 27a, a signal with frequency of $2\Delta f$ to mixer 27b, and a signal with frequency $3\Delta f$ to mixer 27c. These local oscillator signals mix with the signals coupled from mixers 27a, 27b and 27c to produce signals with frequencies $f_{IF}$ at the output terminals of mixers 27a, 27b and 27c. The signals at the output terminal of mixer 27c is then coupled to detector 28c of detector unit 28 via IF amplifier 30c. The video at the output terminals of detectors 28c and 28d which correspond to the received signals having frequencies of $2f_2 - f_1$ and $2f_1 - f_2$ are coupled to video sum unit 33 and added therein. The sum being then provided to video amplifier 34 from which the amplified video is coupled to the display unit 35 and processor unit 36. The signals at the output terminals of mixers 27a and 27b which correspond to the received signals with frequencies $f_1$ and $f_2$ are coupled to correlator 37 via IF amplifiers 30a and 30b wherein they are combined with some logic technique providing a video signal at the output terminal representative of the correlation of the two signals. This video is coupled to video amplifier 38, the video signal output of which is coupled to display unit 35 and processor unit 36.

The processor unit 36 is configured to automatically track the position of the retro-directive antenna 18 by means of the azimuth data coupled from antenna 13 via line 70 and the range information derivable from the video received coupled from either the correlator 37 or the video amplifier 34. Since the signals with frequencies $f_1$ and $f_2$ must compete with clutter, in many environments the combination of signal and clutter received at antenna 13 does not permit the detection of the desired signals by the correlator 37. Thus a video signal from video amplifier 38 is not available for range determination. In these situations, the video signals from video amplifier 34 which are derived from the return signals at frequencies which are linear combinations of $f_1$ and $f_2$, which can only emanate from the retro-directive antenna 18, as explained heretofore, may be manually selected for range tracking. Processor unit 36 is not a novel part of the system as suitable devices for practicing its function are available in the prior art. The function performed by the processor unit 36 is of a general class known as tracking group data and its theoretical basis is explained by W. B. Jones and R. H. Hulsizer in Section 9.8 (page 378 et seq.) of Volume 20 of the Radiation Laboratory Series: "Electronic Time Measurements". A practical form of the device to perform this function is described in the Close U.S. Pat. No. 3,064,250, issued Nov. 13, 1962 for an Automatic Track-While-Scan Channel. When the system is operating in an environment in which the signals at $f_1$ and $f_2$ may be detected by the correlator 37, the signals at frequencies that are linear combinations of $f_1$ and $f_2$ are used as identifying markers on the display 35, thus ensuring that the signals being used for tracking emanate from the retro-directive antenna 18.

Figure 2:
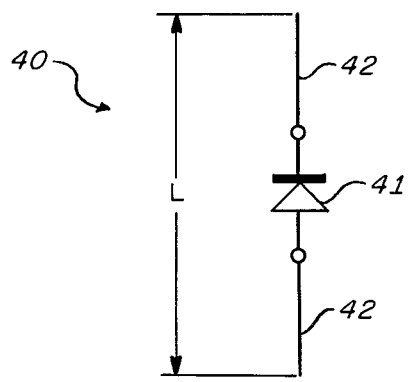
FIG. 2 is an illustration of a dipole antenna with a diode coupled between the antenna terminals.

The retro-directive antenna may be as shown in FIG. 2; therein is shown an antenna 40 comprising electrical conductors 42 which form a dipole, the terminals of which are connected to the respective cathode and anode terminals of a diode 41, the over-all length L of the entire assembly approximating a half wavelength at the central frequency of the operating bandwidth. The antenna resulting from the diode 41 and the conductors 42 receive signals at frequencies $f_1$ and $f_2$ radiated from antenna 13 applying the same to diode 41 wherein the aforementioned composite signal containing a multiplicity of frequencies are generated due to the non-linear characteristics of the diode 41. This composite signal is then omni-directionally re-radiated and subsequently received at antenna 13 and coupled to preamp 21 to FIG. 1.

Figure 3:
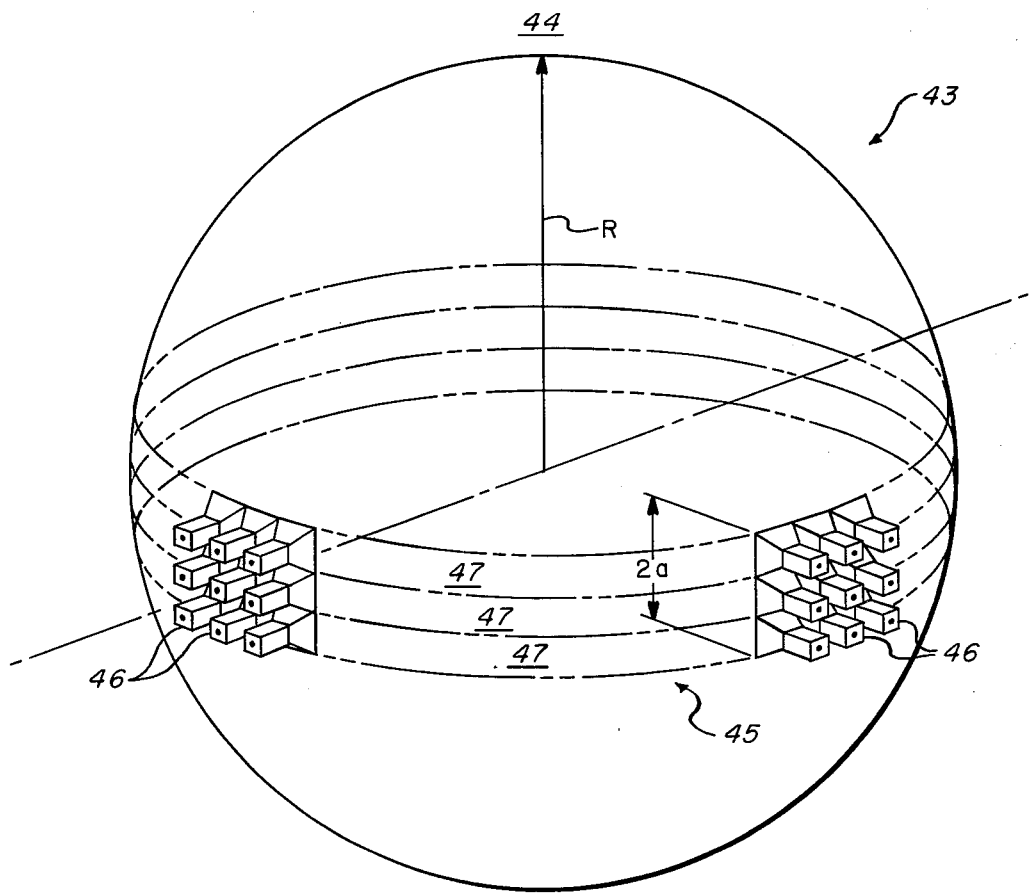
FIG. 3 is a three-dimensional view of a Luneberg lens with an equatorial antenna element belt.

Antenna 40 exhibits a radar cross-sectional area approximately equal to 0.2 $\lambda^2$. This radar cross-section in combination with other system parameters determine the operating range of the over-all system. With other system parameters remaining equal, an appreciable increase in range may be achieved with antenna 43 shown in FIG. 3 which comprises a Luneberg lens 44 with an antenna belt 45 circumferentially disposed about the equator. An electromagnetic wave illuminating antenna 43 at an elevation angle within a specified band above and below the equator, which is determined by the width of the antenna belt 45, will be focused onto the antenna belt to an area diametrically opposite from the approaching wave where the signal energy is collected by at least one of a multiplicity of antennas 46 comprising the antenna belt. The antenna 46 containing a diode or other non-linear device re-radiates a composite signal which possesses frequencies which are linear combinations of the two received signals $f_1$ and $f_2$. Antenna belt 45 may comprise a multiplicity of dipole-diode antennas, such as antenna 40 shown in FIG. 2, circumferentially disposed within a number of bands 47 with the dipole spacing within each band adjusted to provide continuous coverage in the azimuthal sector of interest, whereas the number of bands contained within the belt is determined by the elevation coverage desired.

Figure 4A:
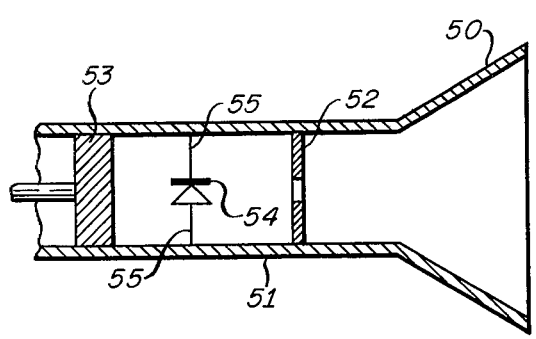
FIGS. 4A and 4B are cross-sectional views of modified horn antennas that are useful as elements in a belt or ring of a retro-directive antenna.
Figure 4B:
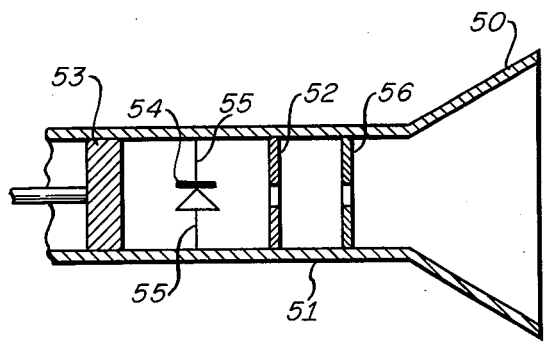

Other antenna configurations, two of which are shown in FIGS. 4a 4b, may be employed as the antenna elements 46 of the antenna belt 45. In FIG. 4a, the antenna element comprises a horn 50, the throat end of which is connected to a chamber comprising a waveguide extension 51 of the horn, a metallic iris diaphragm 52, a metallic piston reflector 53 and a diode 54 mounted in the waveguide between iris 52 and movable piston 53 with the cathode and the anode of diode 54 connected to the top and bottom walls of the waveguide via wires 55. The chamber is made resonant at some desired frequency, determined by its proportions, that is within the operating frequency band that includes transmitted frequencies $f_1$ and $f_2$ and the desired linear combinations thereof. The various parameters of the chamber can be so correlated that substantially all of the wave power of frequencies within the given bandwidth incident on the iris diaphragm enter the chamber when the transmitted signals with frequencies $f_1$ and $f_2$ enter the chamber they are received by diode 54 which proceeds to generate the linear combinations of $f_1$ and $f_2$ mentioned heretofore. As a result of these generated signals, currents are conducted to the walls of the waveguide extension 51 contained within the chamber. These currents will excite the chamber and cause resonance therein, only for frequencies that are within the aforementioned bandwidth. These resonating signals will then be coupled through iris 52 to horn 50 to be retro-directly radiated from the Luneberg lens 43.

In the modification of FIG. 4a, that is illustrated in FIG. 4b, an additional chamber preceding the chamber containing the diode 54 is formed by a second iris 56 spaced apart from iris 52 a known distance such that the two chambers constitute a bandpass filter. This arrangement may be used either to provide a narrower bandwidth by synchronously tuning the two chambers or a broader bandwidth by stagger tuning the two chambers. In the latter case, additional linear combinations of $f_1$ and $f_2$ may be retro-directly radiated.

As stated previously, the elevation coverage of the spherical retro-directive antenna may be increased by widening the equatorial antenna belt 45. However, this increase in width affects an increase in aperture blockage resulting in a decrease in the radar cross-sectional area of the spherical retro-directive antenna, the ratio of the cross-sectional area $\sigma_2$ with blockage to the theoretically maximum cross-sectional area $\sigma_1$ being:

$$\frac{\sigma_2}{\sigma_1} = \left[1 - \frac{2}{\pi}\left(\sin^{-1}\alpha + \alpha\sqrt{1-\alpha^2}\right)\right]^2$$

where $\alpha = a/R$, $a$ is the half width of the antenna belt 45 and R is the radius of the sphere. Thus, a tradeoff exists between the maximum operating range of the system and the elevation coverage.

Figure 5:
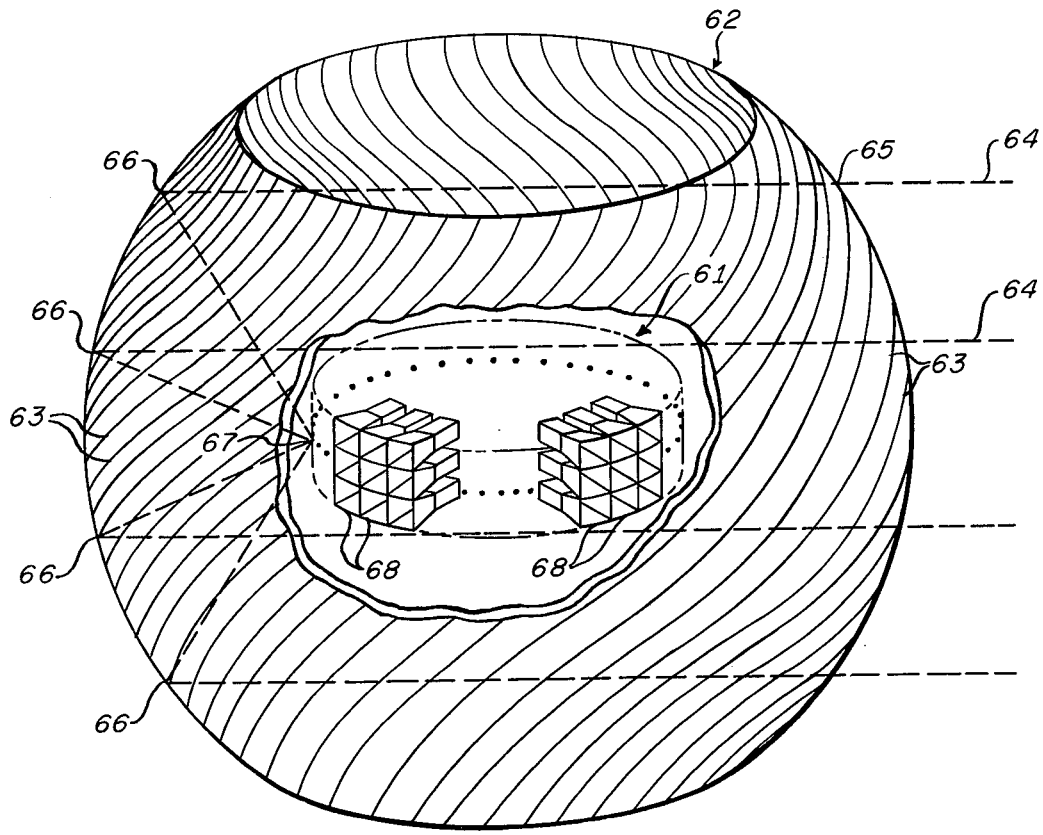
FIG. 5 is a three-dimensional representation of a retro-directive antenna employing a spherical outer shell and an internal cylindrical antenna ring.

Retro-directive antennas as heretofore described are relatively complex, heavy and costly. In FIG. 5 is shown an antenna assembly that provides retro-directivity at an appreciable reduction in complexity, weight and cost. The retro-directive antenna assembly shown in FIG. 5 generally comprises two parts. A cylindrical antenna ring 61 and a spherical shell 62 disposed concentrically about the antenna ring 61. Spherical shell 62 may be constructed in accordance with the teachings of such prior art as U.S. Pat. No. 2,510,020 issued May 30, 1950 to Harley Iams and that of J. Croney et al in an article that appeared in the Microwave Journal of March 1963. In accordance with these teachings, spherical shell 62 comprises a multiplicity of wire or rod like conductors 63 which form an angle of substantially 45 degrees with the horizontal at substantially all latitudes. Thus, an observer at the center of the sphere looking outwards sees wires at 45° on all azimuths but an observer outside looking through the sphere sees wires at 45° on the front surface and at an orthogonal angle −45° on the rear surface. Consequently, rays 64 of a plane wave, each possessing a polarization of −45°, incident on the front surface of the sphere 62 at points 65 each will pass through the mesh of wires without significant loss until each reaches the inner surface at the points 66 where they will be focused by the curve surface to points 67 on the antenna ring 61 and received by element antennas thereat. The element antennas 68 are similar to those heretofore described in conjunction with the antenna belt 45 shown in FIG. 3. Each element antenna 68 contained in the antenna ring 61 is appropriately polarized to receive the signals reflected from the inner surface. These signals are guided therefrom to a non-linear device, which may be a diode, wherein linear combinations of frequencies $f_1$ and $f_2$ generated as previously described. Rays of the generated signal waves radiated from the element 68, antenna located at point 67, illuminate the inner surface of the sphere, and are reflected therefrom traversing a path parallel to that of the incident rays 64. Polarization of the re-radiated wave is such that it passes through the spherical surface at the front of the sphere and continues in the direction of the original source.

Polarization other than −45° cause a loss of radar cross-sectional area. For horizontal, vertical and circular polarization, this loss results in a radar cross-sectional area that is approximately 25% of the projected area. However, the radar cross-section of the antenna assembly 62 is directly proportional to the diameter to the fourth power ($D^4$) and consequently an increase in diameter of 40% will compensate for the polarization loss.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A detection and identification system comprising transmitter means for producing a multiplicity of signals each having a different frequency with a known frequency separation therebetween;

means coupled to said transmitter means for radiating said multiplicity of signals;

signal generating means for receiving said multiplicity of signals and for producing signals at frequencies that are linear combinations of the frequencies of said multiplicity of signals including signals at frequencies of said multiplicity of radiated signals and re-radiating said produced signals; and means for receiving said re-radiated signals and producing output signals in response to said re-radiated signals whereby said signal generating means may be identified.

2. A detection and identification system in accordance with claim 1 said signal generator means includes:

focussing means for focussing signals received from a given azimuthal direction to a given area;

means, cooperating with said focussing means, for receiving focussed signals comprising a multiplicity of signal energy collectors, said collectors positioned to collect signal energy at all of said areas to which said received signals are focussed; and a multiplicity of non-linear elements, one of each coupled to one of said multiplicity of signal energy collectors wherein signals at frequencies which are linear combinations of the frequencies of said radiated multiplicity of signals are generated, thereafter coupled to said focussing means and thereby re-radiated in substantially the same azimuthal direction to that from which said received signals arrived.

3. A detection and identification system in accordance with claim 2 wherein said focussing means is a spherical Luneberg lens with said focussed signal receiving means equatorially disposed thereabout.

4. A detection and identification system in accordance with claim 3 wherein said signal energy collectors are metallic horn antennas.

5. A detection and identification system in accordance with claim 3 wherein said signal energy collectors are dipole antennas.

6. A detection and identification system in accordance with claim 2 wherein said non-linear elements are crystal diodes.

7. A detection and identification system in accordance with claim 2 wherein said focussing means comprises a spherical shell made of conductive wires each inclined at an arc of 45 degrees to the horizontal at all latitudes with said focussed signal receiving means concentrically contained therein.

8. A detection and identification system in accordance with claim 7 wherein said signal energy collectors are metallic horn antennas.

9. A detection and identification system in accordance with claim 7 wherein said signal energy collectors are dipole antennas.

10. A detection and identification system in accordance with claim 1 wherein said receiving means includes:

energy collecting means for collecting energy re-radiated from said signal generator means;

a first mixer coupled to said energy collecting means;

a first local oscillator coupled to said first mixer providing a signal to said first mixer that is at a predetermined frequency separation from a preselected one of said signal frequencies produced by said signal generator means, said frequency separation being an intermediate frequency, the frequency differences between said local oscillator signal frequency and other signal frequencies produced by said signal generator means being at a frequency separation from said intermediate frequency predetermined for each of said other signal frequencies whereby said first mixer provides a combined output signal which includes a signal at said intermediate frequency and a multiplicity of signals at said predetermined frequency separations therefrom, each signal in said combined output signal corresponding to one of said signals produced by said signal generating means;

filter means including a multiplicity of output terminals, coupled to said first mixer, for separating said combined output signals into signals at said intermediate frequency and signals at preselected difference frequencies from said intermediate frequency, said signal at said intermediate frequency and said signals at preselected difference frequencies therefrom corresponding to signals produced by said frequency generator, said signal at said intermediate frequency coupled to one of said multiplicity of output terminals and other output terminals of said multiplicity of output terminals having one of said preselected signals coupled thereto;

a second mixer including a multiplicity of input terminals each with a corresponding output terminal, each of said input terminals coupled to one terminal of said multiplicity of output terminals of said filter means;

a second local oscillator coupled to said second mixer providing signals at frequencies equal to said predetermined frequency differences from said intermediate frequency whereby signals at said intermediate frequency are coupled to said output terminals of said second mixer, each signal corresponding to one of said signals produced by said signal generating means;

means coupled to said intermediate frequency output terminal of said filter means and to said output terminals of said second mixer corresponding to said signals at linear combinations of said frequencies of said multiplicity of radiated signals for reducing signals coupled thereto to video and providing the sum thereof; and means, coupled to said output terminals of said second mixer corresponding to said multiplicity of radiated signals, for correlating signals at said output terminals of said second mixer corresponding to said multiplicity of radiated signals and for reducing to video the correlated signal thereby obtained.

11. A detection and identification system in accordance with claim 1 wherein said transmitter means comprises:
   a multiplicity of signal generators, each for the generation of a signal at a predetermined frequency and each coupled to said radiating means; and
   means for controlling each signal generator of said multiplicity of signal generators to maintain the signal frequency of each of said signal generators within a given frequency band about each of said predetermined frequencies and for maintaining the frequency separation therebetween within a preselected frequency range.

* * * * *